United States Patent [19]

St. Pierre

[11] Patent Number: 5,125,933
[45] Date of Patent: Jun. 30, 1992

[54] GLASS-ENCAPSULATED ABRASIVE PARTICLES FOR VITREOUS BOND GRINDING WHEELS

[75] Inventor: Philippe D. St. Pierre, Worthington, Ohio

[73] Assignee: General Electric Company, Worthington, Ohio

[21] Appl. No.: 741,896

[22] Filed: Aug. 8, 1991

[51] Int. Cl.$^5$ .............................................. B24D 11/00
[52] U.S. Cl. .................................... 51/295; 51/293; 51/298; 51/308
[58] Field of Search .................. 51/293, 295, 298, 308

[56] References Cited

U.S. PATENT DOCUMENTS

| | | | |
|---|---|---|---|
| 3,385,684 | 5/1968 | Voter | 51/295 |
| 3,645,706 | 2/1972 | Bovenkerk et al. | 51/295 |
| 3,664,819 | 5/1972 | Sioui et al. | 51/295 |
| 3,779,727 | 12/1973 | Sioui et al. | 51/298 |
| 3,957,461 | 5/1976 | Lindstrom et al. | 51/295 |
| 4,096,465 | 3/1992 | Chen et al. | 51/293 |
| 4,951,427 | 8/1990 | St. Pierre | 51/293 |
| 4,954,140 | 9/1990 | Kawashiara et al. | 51/293 |

Primary Examiner—William R. Dixon, Jr.
Assistant Examiner—Willie J. Thompson
Attorney, Agent, or Firm—Gary L. Loser

[57] ABSTRACT

Broadly, the present invention comprises substantially spherical glass globules encapsulating an abrasive particle. The globules are suitable for incorporating into a vitreous bonded grinding wheel and can be made by the steps comprising forming a mixture of glass powder, abrasive particles, and a fluent binder. The binder is fused to form a solid mass containing said glass powder and abrasive particles. The solid mass then is attrited into discrete particles. A desired size fraction of particles of the attrited mass then is separated from any undersize and oversize particle fractions. Finally, the desired size fraction is heated to fuse the glass particles into substantially spherical globules which encapsulate one or more of said abrasive particles. The globules are suitable, then, for incorporation into vitreous bonded grinding wheels.

20 Claims, No Drawings

GLASS-ENCAPSULATED ABRASIVE PARTICLES FOR VITREOUS BOND GRINDING WHEELS

BACKGROUND OF THE INVENTION

The present invention relates to abrasive particles, particularly cubic boron nitride (CBN) and diamond, and more particularly to vitreous bonding grinding wheels containing such abrasive particles.

In U.S. Pat. No. 4,951,427, abrasive particles are taught to be coated with at least 20% by weight of a refractory metal oxide selected from the group consisting of titania, zirconia, aluminum, and silica. Such coated abrasive particles are suitable for embedding in a bonding matrix. The coating protects the abrasive particles, primarily CBN, from being attacked by fluxes commonly used in vitreous bond systems. Such alkali metal oxide fluxes attack CBN to form alkali borates with concomitant evolution of large quantities of gas, primarily nitrogen and some ammonia if water is present. These phenomena lead to bloating and slumping of the desired grinding wheel form.

Other propsals include U.S. Pat. No. Re. 31,883 which discloses CBN particles can be coated with from 30 to 80 wt % of nickel and are useful in the manufacture of resin bonded grinding wheels. U.S. Pat. No. 4,011,064 described CBN particles having a rough, flakey granular covering consisting essentially of a coating ranging in composition from metal to a mixture or boride and nitride of the metal intermediate the surface coating and the CBN particles. U.S. Pat. No. 4,399,167 proposes a method of metal coating diamond and CBN. U.S. Pat. No. 3,528,788 discloses resin bonded grinding wheels having embedded therein diamond grit material coated with from 25 to 275 parts of metal per 100 parts of diamond, where the metal is selected from a defined list.

It is also known in the art that the retention of diamonds of the metal bond or saw type in metal matrices can be improved by providing the particles with a double layer coating, such as disclosed in U.S. Pat. Nos. 3,826,630 and 3,929,432.

In order to maximize performance in a grinding wheel, it is important to distribute the abrasive grain very uniformly and, in the case of vitreous bonded wheels, to achieve the correct porosity uniformly and consistently. This latter goal is not easily achieved using present techniques. Control of porosity speaks to several factors in performance, including for example, the crushability of the wheel and the coolant liquid retention.

BROAD STATEMENT OF THE INVENTION

Broadly, the present invention comprises substantially spherical glass globules encapsulating an abrasive particle. The globules are suitable for incorporating into a vitreous bonded grinding wheel and can be made by the steps comprising forming a mixture of glass powder, abrasive particles, and a fluent binder. The binder is dried to form a solid mass containing said glass powder and abrasive particles. The solid mass then is attrited into discrete particles. A desired size fraction of particles of the attrited mass then is separated from any undersize and oversize particle fractions. Finally, the desired size fraction is heated to fuse the glass particles into substantially spherical globules which encapsulate one or more of said abrasive particles. The globules are suitable, then, for incorporation into vitreous bonded grinding wheels.

Advantages of the present invention include the ability to provide the abrasive particles in a uniform size particle which solid improve the manufacture of consistently uniform porosity abrasive wheels. Another advantage is that the abrasive particles also are in a form resistant to attack by alkali metal oxide constituents and vitreous bond systems. These and other advantages will be readily apparent to those skilled in the art based upon the disclosure contained herein.

DETAILED DESCRIPTION OF THE INVENTION

So long as the glass powder used in forming the globules contain no ingredients detrimental to the abrasive particle, virtually any composition glass material can be used. Preferably, however, the coefficient of thermal expansion (CTE) of the glass should be matched to the CTE of the abrasive particle. This means that as low a CTE as possible for the glass powder is preferred. Even some ceramics may be used in forming the globules providing that they can be fused at acceptable working temperatures during the manufacturing process, as more fully described below. The glass powder should range in particle size from about 1 micron to 100 microns, through the size is not critical.

The fluent binder preferably is an aqueous binder for minimizing costs and evolution of volatile organic contaminants. Preferable binders will be volatilized or carbonized during the glass powder fusion step of the process. Binders which exhibit sufficient solubility in water include, for example, simple sucrose/water binder systems or like sacchariferous-based binders, starch/water binder systems, aluminum phosphate binder systems, sodium silicate binder, polyvinyl alcohol, 1% aqueous solutions of xanthan gum, alginate/water binders, and like binder systems. While organic solvent based binders certainly are useful in the practice of the present invention, and well-known, they are distinctly not preferred in industry due to pollution and safety concerns. Thus, the preference for aqueous binders.

The mixture of glass powder, abrasive particles, and fluent binder then is subjected to high intensity mixing to provide dispersion of the abrasive particles therein. Next, the fluent binder is dried to form a cake. The cake then is attrited by conventional grinding or crushing techniques including the use of various media mills, hammer mills, and the like. The desired particle size is a function of the size of the abrasive particle.

Screening of the attrited mass of discrete particles (green particles) enables the collection of a desired size fraction thereof from any undersized and oversized green particle fractions. The non-desired size fractions, while still green, can be recycled back for forming additional mixture which makes the process particularly cost effective in terms of material utilization.

The desired fraction of green particles then is subjected to heating to fuse the glass and form the globules. A preferred technique for achieving such globule formation involves dropping the desired fraction of particles through a heated shot tower which is maintained at a sufficient temperature for the glass to fuse. Alternatively, the fraction of desired particles can be placed in a heated, fluidized bed for a time adequate for the glass particles to fuse into substantially-spherical globules. Regardless of the technique employed, the globules will be substantially spherical and essentially mono-dispersed in size.

Firing of the glass powder for fusing it will result in a particle size reduction from the green particles. Ideally, each abrasive particle will be completely enveloped in a glass sphere or globule; however, incomplete coatings and multiple abrasive particles within a single glass sphere or globule are permitted and are included within the scope of the present invention.

The fired globules containing one or more abrasive particles then can be used in conventional fashion for forming vitreous bonded grinding wheels by various techniques known in the art, and as illustrated in the citations referred to above. The concentration of the abrasive can be controlled additionally by introducing abrasive-free globules in the mix to achieve the correct proportion of abrasive. The size of the globules can range from between about 1 mm and 3 mm. By pressing and sintering under rigorously controlled conditions, a consistent uniform porosity abrasive wheel can be obtained. As noted above. the glass coating additionally protects the abrasive particles from attack by any constituents in the vitreous bond system that may be deleterious thereto.

Additionally, it is feasible to incorporate the fired globules into conventional resin bonded grinding wheels, such as described in U.S. Pat. Nos. 3,645,706; 3,385,684; 3,664,819; 3,779,727; and 3,957,461, the disclosures of which are expressly incorporated herein by reference. The resin most frequently used in resin bonded grinding elements or other abrasive elements is a phenol-formaldehyde reaction product, however, other resins or organic polymers which may be used include melamine or urea formaldehyde resins, epoxy resins, polyesters, polyamides, and polyimides. The concentration of abrasive particles and other parameters are known in the art, such as cited above.

Since certain changes may be made in the above-described invention without departing from the scope of the invention herein involved, it is intended that all matter contained in the description thereof or shown in the accompanying drawings shall be interpreted as illustrative and not in a limiting sense. All citations referred herein are expressly incorporated herein by reference.

I claim:

1. A substantially-spherical fused glass globule encapsulating an abrasive particle.

2. The globule of claim 1 wherein said particle is one or more of diamond or cubic boron nitride (CBN).

3. The globule of claim 2 wherein said particle is CBN.

4. The globule of claim 1 which ranges in size from between about 1 and 3 mm.

5. The globule of claim 1 wherein said particle ranges in size from between about 10 and 1,000 microns.

6. A method for preparing abrasive particles for incorporating into a vitreous bonded grinding wheel, which comprises the steps of:
   (a) forming a mixture of glass powder, abrasive particles, and a fluent binder;
   (b) setting said binder to form a solid mass containing said glass powder and abrasive particles;
   (c) attriting said solid mass into discrete particles;
   (d) separating a desired size fraction of particles of said attrited mass from any undersized and oversized particle fractions; and
   (e) subjecting said desired size fraction to heating to fuse said glass particles into substantially spherical globules which encapsulate one or more of said abrasive particles.

7. The method of claim 6 wherein said abrasive particles comprise diamond, CBN, or mixtures thereof.

8. The method of claim 7 wherein said abrasive particles comprise CNB.

9. The method of claim 7 wherein said fluent binder comprises an aqueous binder.

10. The method of claim 9 wherein said binder is set by evaporation of water.

11. The method of claim 6 wherein said separating is by sieving.

12. The method of claim 6 wherein said fraction in step (e) is dropped through a heated tower to fuse said glass particles.

13. The method of claim 6 wherein said fraction in step (e) is placed in a heated fluidized bed to fuse said glass particles.

14. The method of claim 6 wherein at least a portion of said undersized and oversized particle fractions of step (d) are recycled to step (a) of the method.

15. A method for making a tool comprising:
   (a) blending substantially-spherical glass globules encapsulating an abrasive particle and a bonding matrix;
   (b) placing said blend in a suitable mold and pressing said molded blend; and
   (c) heating said molded blend to fuse said bonding matrix.

16. The method of claim 15 wherein non abrasive-containing glass globules also are added to said blend in step (a).

17. The method of claim 15 wherein said particles comprise one or more of cubic boron nitride (CBN) or diamond.

18. The method of claim 17 wherein said particles comprise CBN.

19. The method of claim 15 wherein said bonding matrix comprises vitreous bonded matrix.

20. The method of claim 15 wherein said bonding matrix comprises a resin bond matrix.

* * * * *